United States Patent Office 2,806,069
Patented Sept. 10, 1957

2,806,069
DECOLORIZATION OF PENTAERYTHRITOL

William R. Cake, Glen Rock, N. J., assignor to Heyden Newport Chemical Corporation, New York, N. Y., a corporation of Delaware No Drawing. Application April 14, 1955,
Serial No. 501,450

7 Claims. (Cl. 260—637)

This invention relates to the preparation of pentaerythritol. More specifically, this invention relates to a new and improved method whereby a color-free pentaerythritol product may be obtained.

This application is a continuation in part of my copending application Serial No. 284,001, filed April 23, 1952, now abandoned.

A conventional process for the preparation of pentaerythritol involves the reaction together of from 4 to 5 mols of formaldehyde with 1 mol of acetaldehyde, the reaction being carried out in the presence of an alkali catalyst. From the standpoint of the mechanism of the reaction, it is generally believed that 1 mol of acetaldehyde reacts first with 3 mols of formaldehyde to produce pentaerythrose, which compound then reacts with another mol of formaldehyde and a mol of sodium hydroxide to produce pentaerythritol. Customarily an excess of sodium hydroxide is used to increase the yield based on the acetaldehyde changed. This two-stage process may be represented by the following equations:

(1) 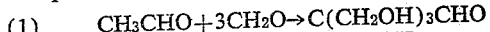
(2) 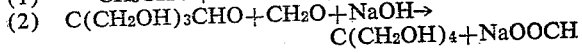

It should be mentioned that in the first stage the alkali serves merely as a reaction catalyst, whereas in the final stage it reacts stoichiometrically. While sodium hydroxide is indicated as the alkali, other alkali metal hydroxides are, of course, utilizable and have previously been utilized in this reaction. Although these reactions actually occur in two distinct stages, ordinarily the complete process is carried out in a single step, the alkali agent initially introduced serving both as catalyst in the first stage and as reactant in the second.

Simultaneously with the above indicated reactions, side reactions occur and the final reaction mixture therefore contains a variety of products including pentaerythritol, polypentaerythritols, water soluble condensation products, alkali metal formate, alkali metal hydroxide and other compounds. The polypentaerythritols include the higher ethers of pentaerythritol, such as dipentaerythritol, tripentaerythritol, and related compounds. Prior to recovery of the pentaerythritol, the excess free alkali metal hydroxide is neutralized with acid, for example, formic or sulfuric acid and then the polypentaerythritols precipitate and are separated.

In crystallizing and separating the pentaerythritol from the aforedescribed reaction liquor, the crystals that are obtained are generally contaminated with various impurities which tend to give the crystals an undesirable color. It is believed that the side reactions occasion the formation of strongly colored yellow to brown by-products which cause not only a serious decrease in the yield of pentaerythritol but also make the isolation of a color-free crystalline pentaerythritol material extremely difficult.

Conventional procedures for avoiding formation of colored by-products are based on a slow, carefully controlled introduction of reagents which makes the manufacture of pentaerythritol a time-consuming process. Even so, formation of colored by-products is hardly ever completely avoided.

In order to improve upon the reaction rate, quality and quantity of yield, refinements in the procedure have been proposed such as the use of excess amounts of formaldehyde, the addition of catalysts to the reaction mixture, or special methods for the introduction of reagents.

In accordance with the present invention, it has become possible to inhibit the formation of colored by-products and to obtain close to theoretical yields of a crystalline color-free pentaerythritol product. This result is achieved without the use of excess formaldehyde and expensive catalysts and without relying upon time-consuming or involved procedures. It has now been found that the color-forming reaction by-products from pentaerythritol liquors can be removed by treatment of said liquors with a mixture comprising a water soluble sulfite, activated carbon, fuller's earth, and zinc dust, prior to the concentration of the reaction liquor. The use of this mixture of decolorizing agents effectively decolorizes pentaerythritol feed liquors.

It should be mentioned that the pentaerythritol referred to throughout the specification and claims contains only the mono and dipentaerythritols, the tripentaerythritol having been removed from the liquor by a previous filtration step.

Thus, excellent results are obtained by treatment of pentaerythritol liquor with a mixture of decolorizing agents comprising at least about 0.5% and preferably about 1% of a sodium or potassium water soluble sulfite, at least about 0.03% and preferably about 0.05% to 0.06% activated carbon, at least about 0.03% and preferably about 0.05% to 0.06% fuller's earth, and at least 0.02% and preferably about 0.04% of zinc dust, the percentages of the various ingredients being based on the weight of the liquor.

While it is possible to secure good results by greatly exceeding the minimum and preferable quantities of the aforestated substances, as a practical matter, no substantial improvements are effected when the excess quantities are used as compared with the indicated preferred quantity.

The water soluble sulfites which may be used are sodium and potassium sulfite, bisulfite and metabisulfite which are soluble to the degree required to obtain the specified concentration in solution.

It should be mentioned that good results are obtained in this process when the specific steps of this method are conducted at substantially low temperatures and preferably at a temperature not above about 55° C. When the temperature is raised, there is a tendency for colored products to be formed probably due to decomposition of the materials utilized and a substantially color-free pentaerythritol material may not be obtained. Temperatures below 55° C. may be used and higher temperatures must be used with caution.

Additional advantages and features of this new and highly improved process are set forth in the following examples which disclose the principles of the invention and the improved embodiments of applying those principles. It is understood, however, that these examples are merely illustrative and not limitative in nature, being capable of various modifications. All parts and percentages are by weight.

EXAMPLE I

To 4000 parts of reaction liquor obtained by the reaction of 4.6 mols of 20% formaldehyde, 1.2 mols of 32% sodium hydroxide, and 1 mol of 100% acetaldehyde followed by removal of the polypentaerythritols, was added 48 parts of sodium metabisulfite, 2.4 parts of activated carbon, 2.4 parts of fuller's earth, and 1.8 parts of zinc dust.

The mixture was stirred for one hour at 50° C. and filtered to remove the insoluble decolorizing materials.

The filtrate was concentrated by evaporation and then was stirred at 10° C. for two hours. The pentaerythritol crystals which precipitated from the solution were filtered off, washed with water and dried. The product contained 0.07% of sodium formate. The color of the molten pentaerythritol increased from 0.5 to 3.0 (as compared to standards prepared by H. A. Gardner Co., 1933) on heating at 250° C. for thirty minutes. The Gardner Standard Colors are described with their chemical constituents in "Physical and Chemical Examination of Paints, Varnishes, Lacquers, Colors" by Gardner and Sward, page 94, 10th edition, 1946, published by Henry Gardner and Co., Bethesda, Maryland.

*Comparative Example I*

The preparation described above was duplicated except that the decolorization step was omitted. The pentaerythritol obtained in this case contained 0.48% of sodium formate. Its color as measured by the Gardner standards increased from 5.0 to 6.5 on heating at 250° C. for thirty minutes.

EXAMPLE II

When a 4000 part sample of a pentaerythritol liquor similar to that described in Example I was treated with a mixture comprising 24 parts of sodium metabisulfite, 2.4 parts of activated carbon, 2.4 parts of fuller's earth and 1.8 parts of zinc dust at 50° C. for an hour and the filtered liquor evaporated to a specific gravity at 50° C. of 1.31 before the isolation of the pentaerythritol, the product contained 0.47% of sodium formate. Its Gardner color increased from 3.0 to 5.5 on heating at 250° C. for thirty minutes.

*Comparative Example II*

A sample of the liquor used in Example II was worked up without the use of a decolorizing step. The product contained 1.08% of sodium formate. Its Gardner color increased from 6.0 to 9.0 when it was heated at 250° C. for thirty minutes.

It is apparent from the foregoing that the invention is capable of various modifications and that therefore it is intended and desired to embrace within the scope of this invention such modifications and changes that are necessary to adapt it to varying conditions and uses as defined by the scope of the appended claims.

I claim:

1. In the process for the decolorization of pentaerythritol in the reaction liquor obtained by the condensation of acetaldehyde and formaldehyde in the presence of an alkali metal hydroxide catalyst and by removal of insoluble polypentaerythritol, the improvement which comprises treating said pentaerythritol liquor with a mixture comprising at least about 0.5% of a water soluble sulfite selected from the group consisting of the sodium and potassium sulfites, bisulfites and metabisulfites, at least about 0.03% of activated carbon, at least about 0.03% of fuller's earth, and at least about 0.02% of zinc dust, removing the insoluble portion of the mixture from the liquor, and thereafter separating pentaerythritol crystals from the liquor.

2. In the process for the decolorization of pentaerythritol in the reaction liquor obtained by the condensation of acetaldehyde and formaldehyde in the presence of sodium hydroxide catalyst and by removal of insoluble polypentaerythritol, the improvement which comprises treating said pentaerythritol liquor with a mixture comprising at least about 0.5% of sodium sulfite, at least about 0.03% of activated carbon, at least about 0.03% of fuller's earth, and at least about 0.02% of zinc dust, removing the insoluble portion of the mixture from the liquor, and thereafter separating pentaerythritol crystals from the liquor.

3. In the process for the decolorization of pentaerythritol in the reaction liquor obtained by the condensation of acetaldehyde and formaldehyde in the presence of sodium hydroxide catalyst and by removal of insoluble polypentaerythritol, the improvement which comprises treating said pentaerythritol liquor with a mixture comprising at least about 0.5% of potassium sulfite, at least about 0.03% of activated carbon, at least about 0.03% of fuller's earth, and at least about 0.02% of zinc dust, removing the insoluble portion of the mixture from the liquor, and thereafter separating pentaerythritol crystals from the liquor.

4. In the process for the decolorization of pentaerythritol in the reaction liquor obtained by the condensation of acetaldehyde and formaldehyde in the presence of sodium hydroxide catalyst and by removal of insoluble polypentaerythritol, the improvement which comprises treating said pentaerythritol liquor with a mixture comprising at least about 0.5% of sodium metabisulfite, at least about 0.03% of activated carbon, at least about 0.03% of fuller's earth, and at least about 0.02% of zinc dust, removing the insoluble portion of the mixture from the liquor, and thereafter separating pentaerythritol crystals from the liquor.

5. In the process for the decolorization of pentaerythritol in the reaction liquor obtained by the condensation of acetaldehyde and formaldehyde in the presence of an alkali metal catalyst and by removal of insoluble polypentaerythritol, the improvement which comprises treating said pentaerythritol liquor with a mixture comprising about 1% of a water soluble sulfite selected from the group consisting of the sodium and potassium sulfites, bisulfites and metabisulfites, about 0.05% to 0.06% of activated carbon, about 0.05% to 0.06% of fuller's earth, and about 0.04% of zinc dust and at a temperature not in excess of about 55° C., removing the insoluble portion of the mixture from the liquor, and thereafter separating pentaerythritol crystals from the liquor.

6. In the process for the decolorization of pentaerythritol in the reaction liquor obtained by the condensation of acetaldehyde and formaldehyde in the presence of sodium hydroxide catalyst and by removal of insoluble polypentaerythritol, the improvement which comprises treating said pentaerythritol liquor with a mixture comprising about 1% of sodium metabisulfite, about 0.05% to 0.06% of activated carbon, about 0.05% to 0.06% of fuller's earth, and about 0.04% of zinc dust and at a temperature not in excess of about 55° C., removing the insoluble portion of the mixture from the liquor, and thereafter separating pentaterythritol crystals from the liquor.

7. In the process for the decolorization of pentaerythritol in the reaction liquor obtained by the condensation of acetalhehyde and formaldehyde in the presence of an alkali metal hydroxide catalyst and by removal of insoluble polypentaerythritol, the improvement which comprises treating said pentaterythritol liquor with a mixture comprising at least about 0.5% of a water soluble sulfite selected from the group consisting of the sodium and potassium sulfites, bisulfites and metabisulfites, at least about 0.03% of activated carbon, at least about 0.03% of fuller's earth, and at least about 0.02% of zinc dust and at a temperature not above 55° C., removing the insoluble portion of the mixture from the liquor, and then concentrating the liquor by evaporating at a temperature not above 55° C. and separating pentaerythritol crystals from the concentrated liquor.

References Cited in the file of this patent

UNITED STATES PATENTS 1,089,775     Lindner _____ Mar. 10, 1914

OTHER REFERENCES

Lange Handbook of Chemistry, 8th Edit., pp. 290–1.
Vogel Textbook of Practical Org. Chem., Longmans, Green & Co., New York, 1948; pp. 126–8, 329–30.
Lucas et al.: Principles and Practice in Org. Chem., Wiley & Sons, N. Y., 1949, pp. 64–6.